No. 760,593. PATENTED MAY 24, 1904.
G. T. WHITE.
MINING PICK.
APPLICATION FILED SEPT. 29, 1903.
NO MODEL.
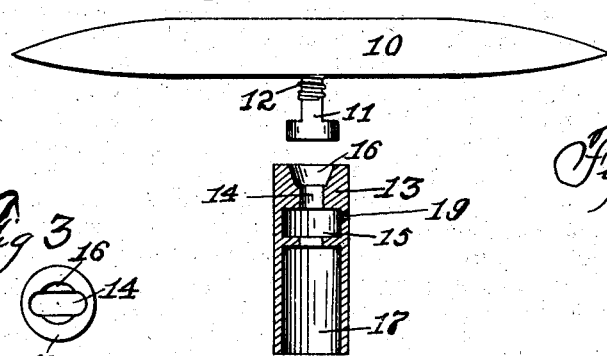
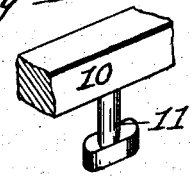
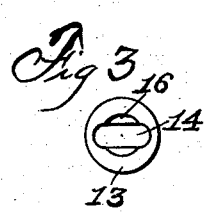
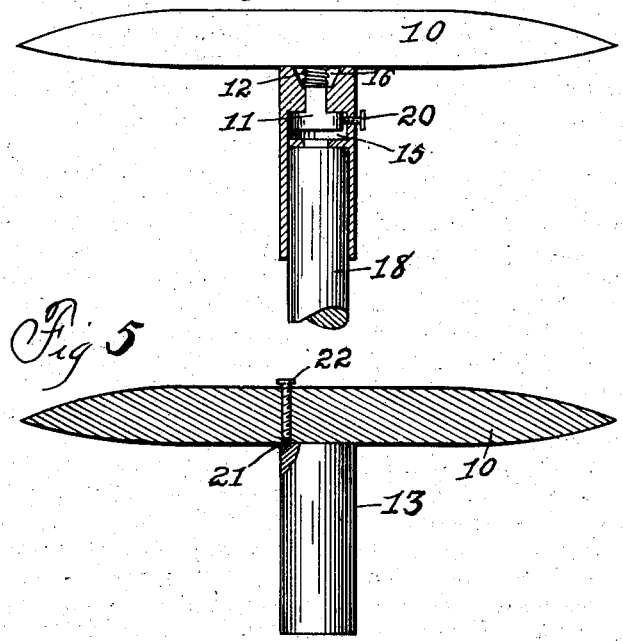

No. 760,593. Patented May 24, 1904.

UNITED STATES PATENT OFFICE.

GEORGE T. WHITE, OF COLFAX, IOWA.

MINING-PICK.

SPECIFICATION forming part of Letters Patent No. 760,593, dated May 24, 1904.

Application filed September 29, 1903. Serial No. 175,025. (No model.)

*To all whom it may concern:*

Be it known that I, GEORGE T. WHITE, a citizen of the United States, residing in Colfax, county of Jasper, and State of Iowa, have invented a new and useful Improvement in Mining-Picks, of which the following is a specification.

The object of my invention is to provide a removable head for a mining-pick which when it is attached to the handle will be as firmly secured thereto as though it were integral therewith, but which may be easily and quickly detached from the handle for purposes of sharpening or replacing.

A further object is to provide such a means in as simple, strong, durable, and inexpensive a manner as possible.

My invention consists of certain details of construction hereinafter set forth, pointed out in my claim, and illustrated in the accompanying drawings, in which—

Figure 1 shows a side elevation view of my pick-head and a longitudinal sectional view of the socket I employ, the parts being separated. Fig. 2 shows a side elevation view of the pick head and handle and a longitudinal sectional view of the socket I employ, the parts being joined. Fig. 3 shows a plan view of the socket I employ. Fig. 4 is a detail view of a portion of the pick-head, showing the downwardly-extending shank I employ; and Fig. 5 shows a modified view of my invention.

Referring to the accompanying drawings, the reference-numeral 10 is used to indicate my pick-head, having mounted centrally in its under surface a downwardly-extending T-shaped shank 11, the shaft of said shank being cylindrical in form and the cross-piece being parallel with the pick-head. Mounted centrally in the under surface of the pick-head 10 and coiled around the cylindrical shaft of the T-shaped shank 11 is a coil-spring 12.

The numeral 13 indicates the socket I employ, containing an oblong slot 14, extending downwardly from its upper surface, said slot connecting at its base with a large cylindrical recess 15, located centrally in the inside of the socket 13. The oblong slot 14 is designed to be of the same shape as the cross-piece attached to the shaft of the T-shaped shank 11 and is adapted to receive said T-shaped shank 11, and the length of said oblong slot 14 is designed to be such that the cross-piece attached to the end of the T-shaped shank 11 will extend through it and into the large cylindrical recess 15.

The numeral 16 indicates a recess extending downwardly from the top surface of the socket 13, said recess having inclined sides and designed to be larger at its base than the width of the oblong slot 14, so that as it extends downwardly through the said slot 14 it may be provided with a base. This recess 16 is designed to receive the coil-spring 12 for purposes hereinafter set forth.

The numeral 17 indicates an opening extending upwardly from the base of the socket 13, being designed to receive a handle 18, and the numeral 19 indicates a screw-threaded opening extending transversely from the outer surface of the socket 13 to the large cylindrical recess 15, said screw-threaded opening 19 being adapted to receive a set-screw 20, designed to engage the side of the T-shaped shank 11 when the parts of my device are connected and it is ready for use.

In my modified form illustrated in Fig. 5 the numeral 21 indicates a screw-threaded opening extending transversely through the pick-head 10, being adapted to receive a set-screw 22, designed to engage the top surface of the socket 13 when the parts of my device are connected.

In practical use, the handle 18 being secured to the socket 13, the T-shaped shank 11 is inserted in the oblong slot 14 and moved downwardly, the coil-spring 12 moving downwardly in the recess 16 until the base of the coil-spring meets the base of the recess, and then the head 10 is forced downwardly on the coil-spring 12 until the cross-piece mounted on the shaft of the T-shaped shank is forced through the oblong slot 14 and into the cylindrical recess 15. The head 10 is then turned one-quarter of a revolution on the socket 13, the cross-piece of the T-shaped shank 11 turning in the cylindrical recess 15, and the set-screw 20 is then screwed firmly in place against the end of the cross-piece of the shank 11, and thus it is obvious the head 10 will be firmly secured, so it cannot further revolve. The object of the coil-spring 12 is to create a force that will hold the head 10 firmly against the socket 13 and not permit any play of the parts in the event that by wear the head 10 should not fit flush with the socket 13.

In my modified form illustrated in Fig. 5 the parts and the manner of connecting them are precisely the same as I have described except that the set-screw 22, designed to provide against any unwonted revolution of the head on the socket, extends through the pick-head 10 and butts against the upper surface of the socket 13.

Having thus described my invention, what I claim, and desire to secure by Letters Patent of the United States, is—

In a mining-pick, the combination of a pick-head 10 provided with a downwardly-extending T-shaped shank 11 secured centrally to its under surface, a coil-spring 12 secured in its under surface and coiled around the shank 11; a socket 13 provided with an oblong slot 14 extending downwardly from its upper surface, an inclined recess 16 extending downwardly from its upper surface, a cylindrical recess 15 located at the base of the oblong slot 14, an opening 17 extending upwardly from the base of said socket 13, a screw-threaded opening 19 extending transversely from the outer surface of the socket 13, to the recess 15; a set-screw 20; a handle 18, all arranged and combined for the purposes stated.

GEORGE T. WHITE.

Witnesses:
 FRANK STEINER,
 T. S. ROE.